(12) United States Patent
Luo et al.

(10) Patent No.: US 7,519,207 B2
(45) Date of Patent: Apr. 14, 2009

(54) DETECTION AND CORRECTION METHOD FOR RADIOGRAPH ORIENTATION

(75) Inventors: Hui Luo, Rochester, NY (US); Jiebo Luo, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 626 days.

(21) Appl. No.: 10/993,055

(22) Filed: Nov. 19, 2004

(65) Prior Publication Data

US 2006/0110068 A1     May 25, 2006

(51) Int. Cl.
*G06K 9/00* (2006.01)
*H05G 1/64* (2006.01)
(52) U.S. Cl. .................. 382/128; 382/291; 378/98.9
(58) Field of Classification Search ............... 382/100, 382/128, 129, 130, 131, 132, 133, 156, 168, 382/181, 190, 194, 199, 203, 219, 224, 232, 382/255, 260–297, 171, 254, 134, 305; 600/408; 378/98.9
See application file for complete search history.

(56) References Cited

U.S. PATENT DOCUMENTS

| | | | |
|---|---|---|---|
| 5,633,511 A | 5/1997 | Lee et al. | |
| 5,982,916 A * | 11/1999 | Kuhn | 382/132 |
| 6,058,322 A * | 5/2000 | Nishikawa et al. | 600/408 |
| 6,625,303 B1 * | 9/2003 | Young et al. | 382/132 |
| 6,751,290 B2 * | 6/2004 | Salb | 378/98.9 |
| 6,970,587 B1 * | 11/2005 | Rogers | 382/132 |
| 7,123,762 B2 * | 10/2006 | Giger et al. | 382/132 |

FOREIGN PATENT DOCUMENTS

| | | |
|---|---|---|
| EP | 1 058 458 | 12/2000 |
| EP | 1 450 305 | 8/2004 |

OTHER PUBLICATIONS

John M. Boone et al., "Recognition of Chest Radiograph Orientation for Picture Archiving and Communications Systems Display Using Neural Networks", Journal of Imaging, vol. 5, No. 3, August, pp. 190-193 (1992).*
Morse et al., "Multiscale medical analysis of medical images", Image and Vision Computing, vol. 12, No. 6, Jul./Aug. 1994, pp. 327-338.
Yongmei Michelle Wang et al., "Detecting image orientation based on low-level visual content", Computer Vision and Image Understanding, 93 (2004) pp. 328-346.
Aditya Vailaya et al., "Automatic Image Orientation Detection", IEEE, 1999, pp. 600-604.
Michael G. Evanoff et al., "Automatically determining the orientation of chest images", SPIE, vol. 3035, pp. 299-307, (1991).

(Continued)

*Primary Examiner*—Seyed Azarian

(57) ABSTRACT

A method for detecting and correcting the orientation of a radiograph. The method generally includes the steps of accessing the radiograph; locating a region of interest in the radiograph; and using the located region of interest and a classifier to detect the orientation of the radiograph. In a preferred embodiment, the radiograph is preprocessed.

8 Claims, 8 Drawing Sheets

OTHER PUBLICATIONS

John M. Boone et al., "Recognition of Chest Radiograph Orientation for Picture Archiving and Communications Systems Display Using Neural Networks", Journal of Imaging, vol. 5, No. 3, August, pp. 190-193, (1992).

Ewa Pietka et al., "Orientation Correction for Chest Images", Journal of Digital Imaging, vol. 5, No. 3, Aug. 1992, pp. 185-189.

Aditya Vailaya et al., "Reject Object for VQ-based Bayesian Classification", IEEE, 2000, pp. 48-51.

"Automatic Image Orientation Detection" by Aditya Vailaya et al., IEEE Transactions on Image Processing, vol. 1-11, No. 7, 2002, pp. 746-755, XP002377851.

"Digital Image Processing" by Rafael C. Gonzales, et al., 2002, Prentice Hall, New Jersey, pp. 57-58, 78-84, 567-634 and 650-653, XP002381732.

* cited by examiner

US 7,519,207 B2

DETECTION AND CORRECTION METHOD FOR RADIOGRAPH ORIENTATION

FIELD OF THE INVENTION

The invention relates generally to techniques for processing radiographs, and in particular to, techniques for automatically detecting and correcting the orientation of radiographs.

BACKGROUND OF THE INVENTION

Picture archiving and communications systems (PACS) are employed for acquiring images from various modalities, storing and retrieving the acquired images, and distributing and presenting the acquired images on a display workstation. Such modalities can include Magnetic Resonance Imaging (MRI), Computer Tomography (CT), Positron Emission Tomography (PET), and Ultrasonography (US), computed radiography (CR), digital radiography (DR), and the like.

In displaying an image on a PACS system, an image is preferred to be displayed in its correct orientation. This can be readily accomplished if the image is acquired from Magnetic Resonance Imaging (MRI), Computer Tomography (CT), Positron Emission Tomography (PET), and Ultrasonography (US), since the orientation of the image is already known during the acquisition.

However, for other modalities, for example Computed Radiography (CR), the image orientation is an issue since the orientation is not known, because CR cassettes, like film cassettes, are independent of the capture equipments. That is, they can be placed at various orientations to accommodate examination conditions. Therefore, the image orientation is unknown until it is processed and displayed on screen.

This situation also exists in digitized films. When a radiology department invests in digital image retrieval system, it is often necessary to digitize a large number of films to provide on-line recall of previous examinations in the PACS. The large-scale digitization of radiographic film is often performed using bulk feeders; therefore, the orientation of the film as it is digitized is often unknown to the PACS.

Currently, the operation of correcting image orientation is usually performed manually by technologists. Although rotating an image on a workstation can be accomplished in a few moments, when given a large number of radiographs to review, the accumulated time spent and cost required can be substantial.

Moreover, there are other factors associated with the need of correcting image orientation. For example, proper orientation of an image could benefit image quality and improve diagnostic confidence. Accurate medical diagnosis often depends on the correct display of diagnostically relevant regions in images. Correctly oriented images can promote the consistence of position of diagnostically relevant regions in radiographs, facilitate the segmentation and extraction of these regions, and further help to design more robust and effective image processing algorithms for rendering and displaying images.

Accordingly, a need exists for a method for automatically detecting the orientation of radiographs and reorienting them (if necessary) to a position preferred by radiologist (or other viewer). Such a method would promote the efficiency and effectiveness of image management and display in PACS, and expedite workflow in hospitals.

However, recognizing orientation of radiographs is a challenging problem as radiographs are often taken under a variety of examination conditions. The patient's pose and size can be a variant; the radiologist may have a preference depending on the patient's situation. These factors can result in radiographs from the same examination that appear quite different. Humans tend to use high level concepts to identify the correct orientation of an image by capturing the image contents, grouping them into meaningful objects and matching them with contextual information. However all these analysis procedures are difficult for computer to achieve in the real world.

Some approaches have been proposed to identify the orientation of chest radiographs.

For example, Pieka et al. ("Orientation Correction for Chest Images", Journal of Digital Imaging, Vol. 5, No. 3, 1992) presented an automatic method to determine the projection and orientation of chest images using two projection profiles of images, obtained by calculating the average densities along horizontal and vertical lines.

Boone et. al. ("Recognition of Chest Radiograph Orientation for Picture Archiving and Communication Systems Display Using Neural Networks", Journal of Digital Imaging, Vol. 5, No. 3, 1992) presented an artificial neural network to classify the orientation of chest radiographs. The features extracted include two projection profiles and four regions of interest.

Evanoff et. Al. ("Automatically Determining the Orientation of Chest Images", SPIE Vol. 3035) applied linear regression on two orthogonal profiles to determine the top of the image, then sought the edge of heart to determine if the image requires reorientation.

Due to the characteristics of chest radiographs, the approaches mentioned above may have achieved certain degrees of success in their particular applications. However, these approaches are not appropriate for other exam type radiographs, such as elbow, knee, cervical spine and the like, because the projection profile is an accumulated pixel value along rows and columns, and is not sufficiently detailed to provide the image orientation information. Moreover it is very sensitive to the noise and patient's position.

Natural scene image orientation detection has been considered. Vailaya et. al. ("Automatic image orientation detection", IEEE International Conference on Image Processing, Vol. 2, 1999) employed Bayesian learning network to classify the image orientation. Wang et al. ("Detecting image orientation based on low-level visual content", Computer Vision and Image Understanding, Vol. 93, 2004) presented an automated image orientation detection algorithm based on both structural and color (low level) content features. In both methods, a feature is color. However, since the color-based features are not available in radiographs, the methods are not suitable for radiograph orientation detection.

Document image orientation detection is known. However, because of the significant difference between document images and radiographs, these methods are not suited for the orientation of radiographs.

Accordingly, there exists a need for a method to automatically detect the orientation of radiographs. Such a method should be robust and suited to accommodate large variations in radiographs

SUMMARY OF THE INVENTION

One object of the present invention is to provide an automated method for detecting the orientation of radiographs.

Another object of the present invention is to provide a method to correct the display orientation of radiographs.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the present invention, these methods are accomplished by the steps of: pre-processing an input radiograph (optional), extracting a region of interest from the radiograph, recognizing the orientation of radiograph, and correcting the image orientation if necessary.

Preprocessing an input radiograph includes sub-sampling the original image, segmenting the image into foreground, background and anatomy, and normalizing the image intensity based on characteristics of the anatomy.

Extracting a region of interest from the radiograph includes detecting the medial axis of the anatomy, determining the center, size and shape of a region of interest, and locating the region of interest in the radiograph.

Recognizing the orientation of radiograph can be accomplished by extracting a set of orientation relevant features from the region of interest and classifying them using a trained classifier.

The image can then be reoriented to the desired orientation according to the outcome of the classifier, if necessary.

The present invention provides some advantages, including robustness and efficiency. For example, with regard to promoting robustness, preprocessing of radiographs helps avoid the interference from the collimation areas and other noise. In addition, features used for orientation classification are invariant to size, translation and rotation. With regard to promoting efficiency, the processes can be implemented on a sub-sampled coarse resolution image, which increases the speed of the recognition process.

BRIEF DESCRIPTION OF THE DRAWINGS

The foregoing and other objects, features, and advantages of the invention will be apparent from the following more particular description of embodiments of the invention, as illustrated in the accompanying drawings. The elements of the drawings are not necessarily to scale relative to each other.

FIG. 3A displays the original image. FIGS. 3B-3D, respectively, display the foreground, background and anatomy images from the segmentation. FIG. 3E shows the normalized image.

FIG. 4A shows the original image. FIG. 4B shows the Euclidean distance map calculated from the anatomy image. FIG. 4C displays the medial axis detected from the anatomy image.

FIG. 5A depicts the region of interest extracted from a cervical spine radiograph. FIG. 5B shows the region of interest found in a hand radiograph.

DETAILED DESCRIPTION OF THE INVENTION

Figure 1A:
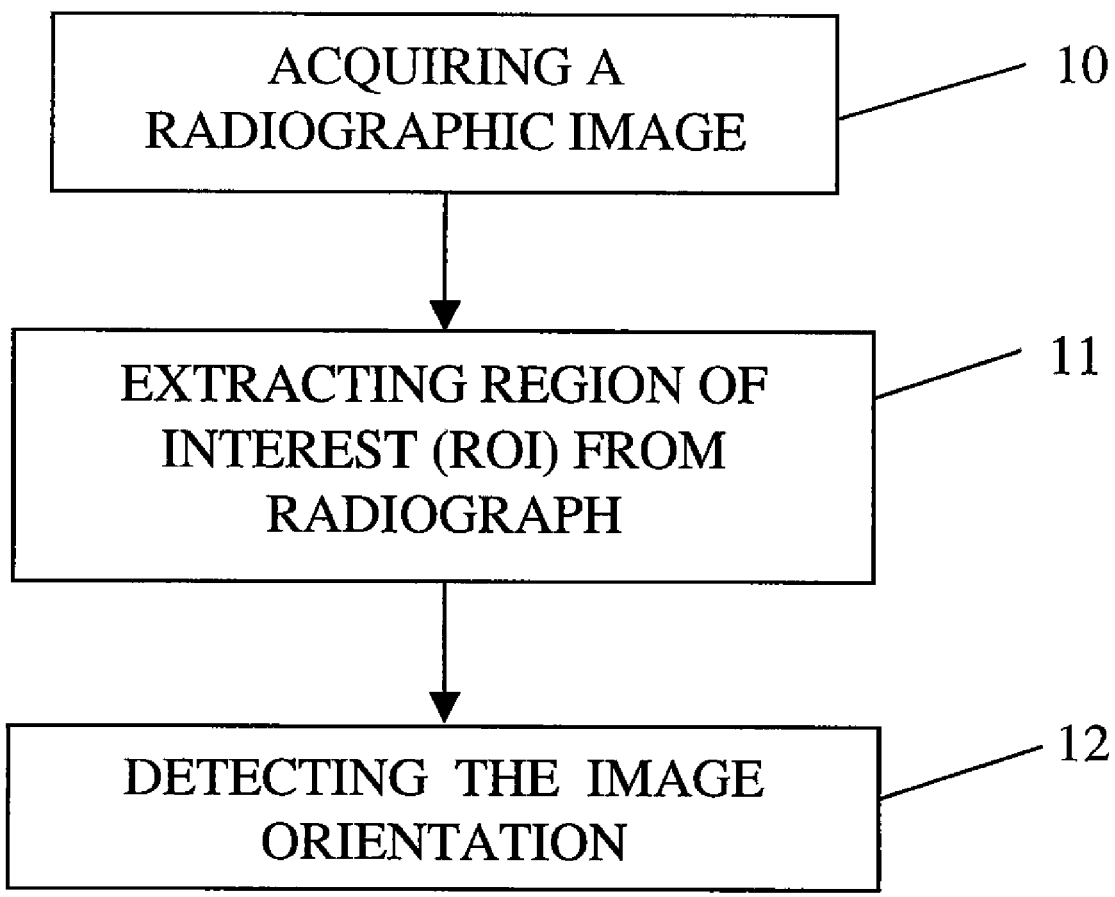
FIGS. 1A, 1B and 1C show flow charts illustrating the automated method for detecting the orientation of radiographs.

The following is a detailed description of the preferred embodiments of the invention, reference being made to the drawings in which the same reference numerals identify the same elements of structure in each of the several figures.

Figure 1B:
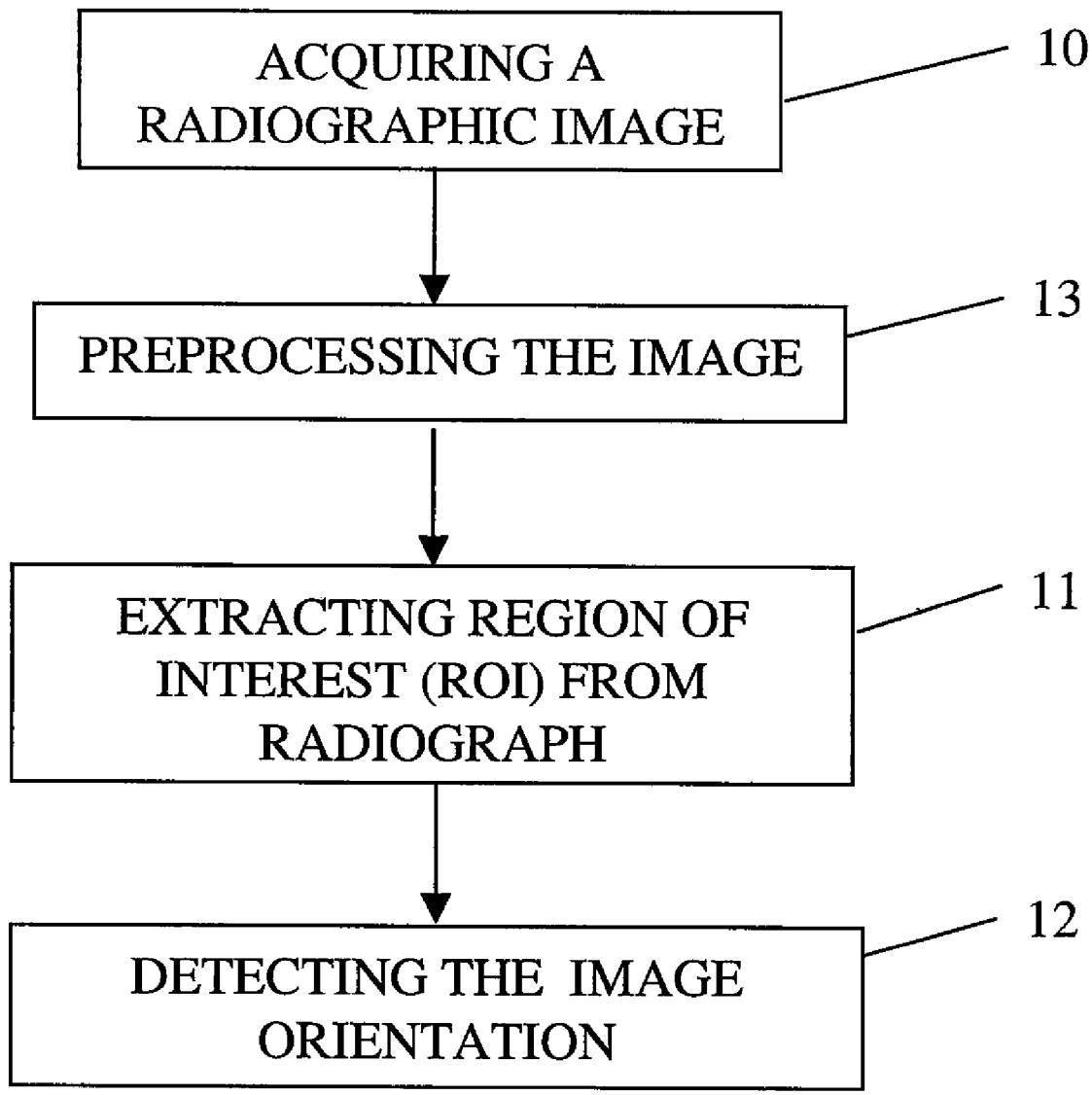
Figure 1C:
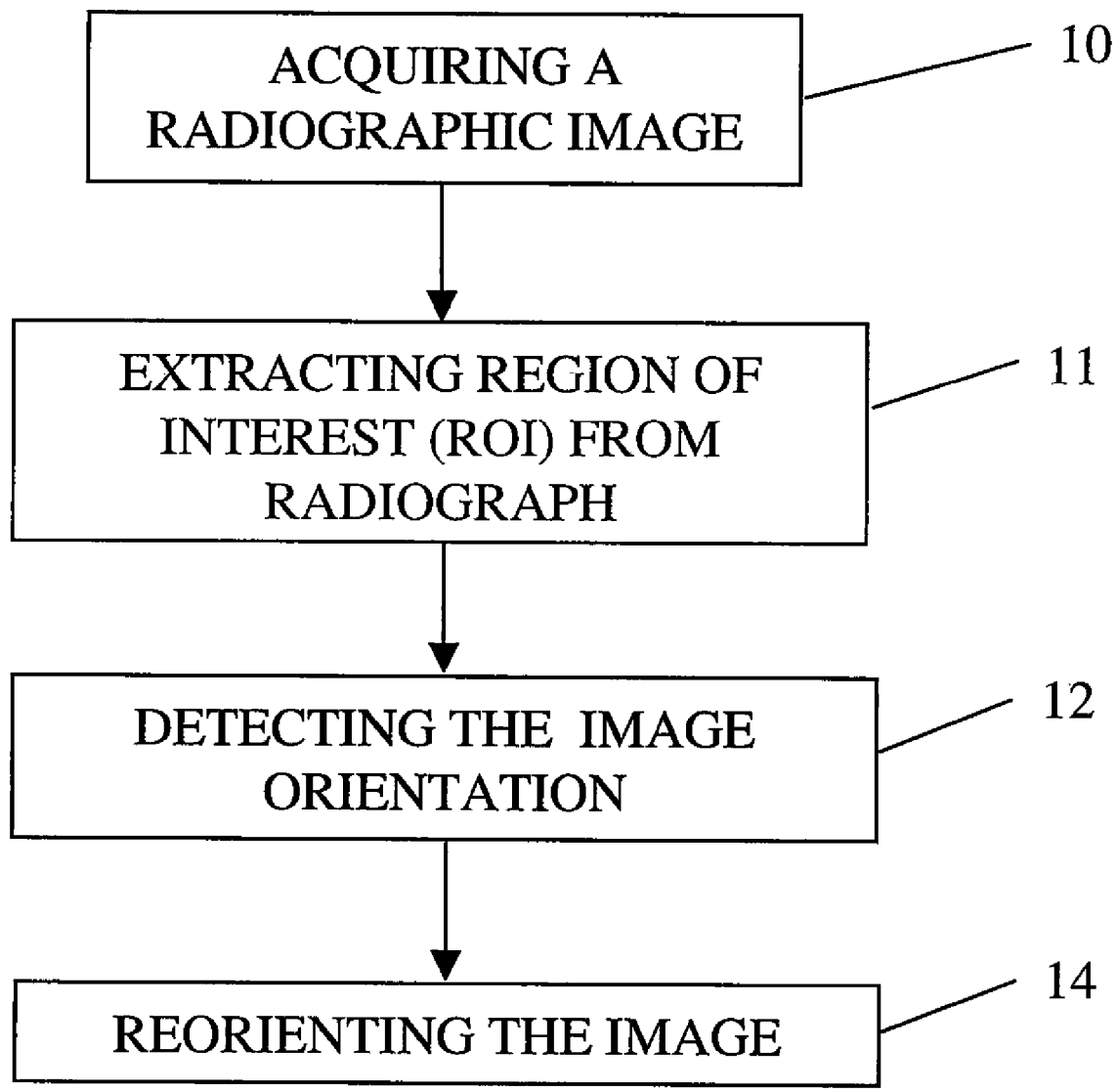

The present invention is directed to a method for automatically detecting the orientation of radiographs. FIGS. 1A, 1B and 1C show flow charts illustrating the automated method for detecting the orientation of radiographs.

A first embodiment of the method in accordance with the present invention is shown in FIG. 1A. As shown in FIG. 1A, the method includes several steps, including acquiring/accessing a radiographic image in digital form (step 10); extracting a Region of Interest (ROI) from the input radiograph (step 11); and detecting the orientation of radiograph using a set of features and a pre-trained classifier (step 12). These steps will be more particularly describe below.

In a further embodiment of the present invention, shown in the flow chart of FIG. 1B, an additional step can be accomplished prior to the ROI extraction of step 11. This additional step, noted in FIG. 1B as step 13, is the preprocessing of radiographs, and will be more particularly described below.

In a still further embodiment, shown in the flow chart of FIG. 1C, an optional step can be added after the orientation detection (step 12). This optional step (noted in FIG. 1C as step 14) is the reorientation of the radiograph to a position preferred by a radiologist(s).

Initially, at step 10, a radiographic image is acquired, and is a digital image. It can be acquired using directly using modalities known to those skilled in the art, or indirectly by means known to those skilled in the art, for example, by the digitization of an analog x-ray film image.

According to the present invention, the step of preprocessing the image (step 13) includes three aspects: (1) minimizing the number of pixels that need to be processed, with such minimization being accomplished without degrading the performance of recognition; (2) reducing the interference from collimation areas (e.g., foreground) and direct exposure areas (e.g., background), so that the orientation recognition is driven by the diagnostically useful part of image data (e.g., anatomy); and (3) generating a consistent intensity and contrast image for any following processes.

Figure 2:
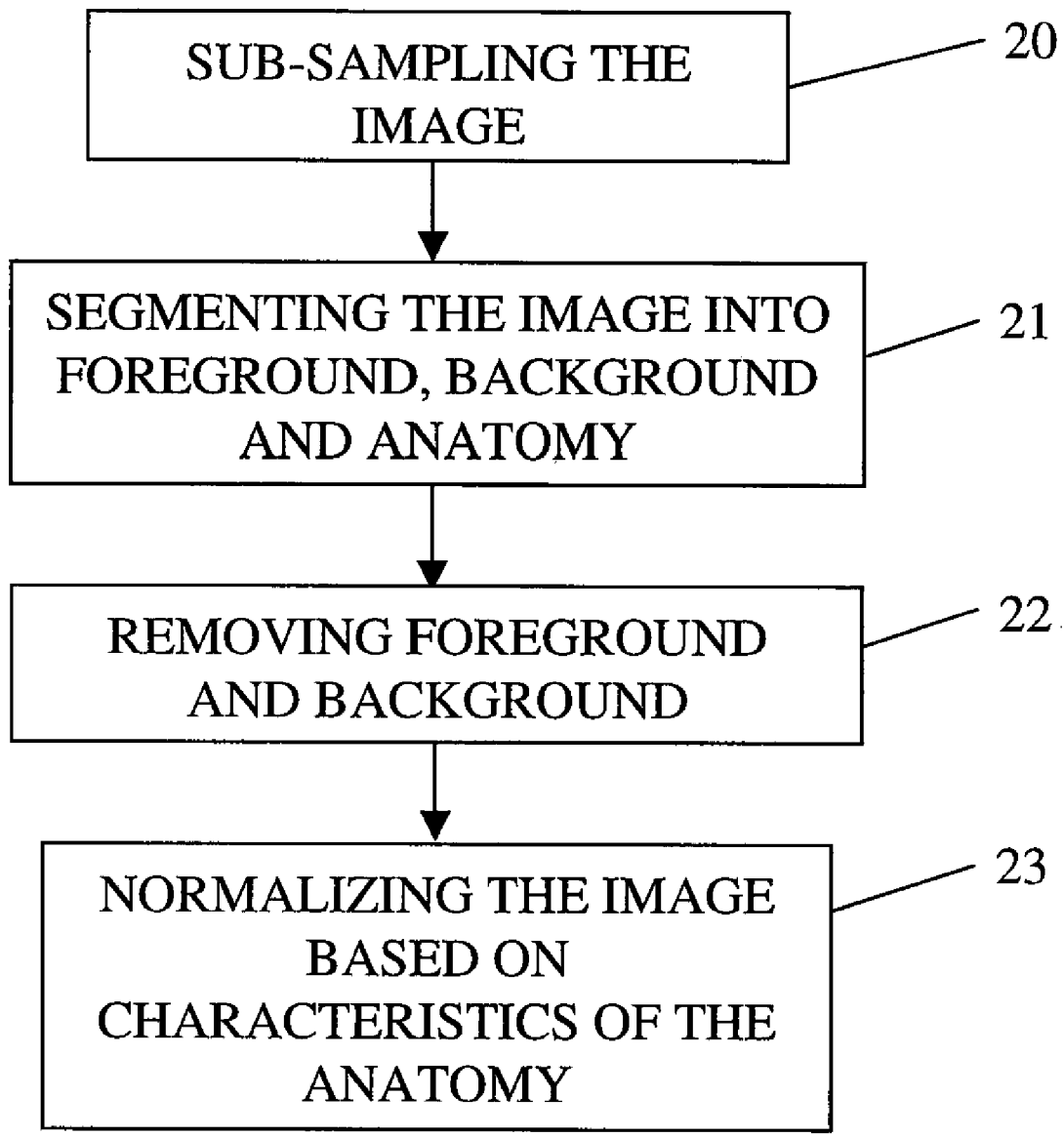
FIG. 2 shows a flow chart illustrating the preprocessing step.

Referring now to FIG. 2, there is shown a flow chart illustrating a method for preprocessing radiographs (step 13). The preprocessing method includes sub-sampling the original image (i.e., the acquired image of step 10) to a small-size coarse resolution image (step 20). This sub-sampled image is then segmented into foreground, background, and anatomy regions (step 21). Later, the foreground and background regions are removed from the image (step 22), wherein only the anatomy region is kept for future processing. At the final step of preprocessing, the resulting image (i.e., the anatomy region) is normalized based on the intensity range of the anatomy region (step 23).

Sub-sampling of the original image (step 20) can be accomplished by known methods used for reducing image size while preserving sufficient image information for orientation recognition, such methods being known to those skilled in the art. In one embodiment of the present invention, a pyramid data structure is employed. The resulting sub-sampled image is then used for the following processes.

Figure 3A:
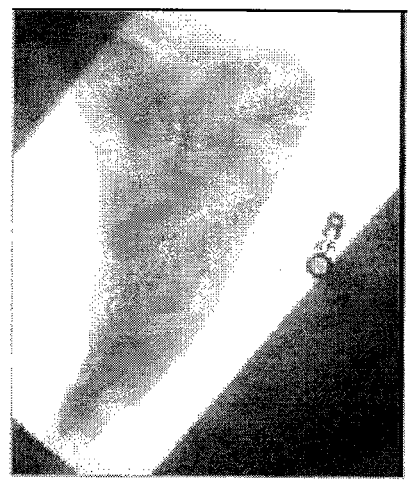
FIGS. 3A-3E show diagrammatic views illustrating the results from the preprocessing step.
Figure 3B:
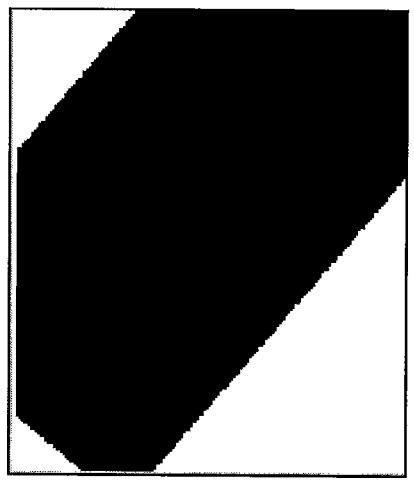
Figure 3C:
Figure 3D:
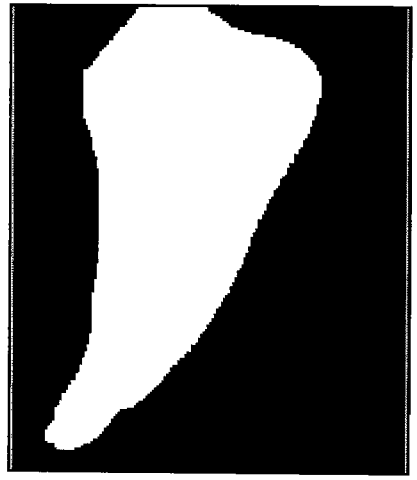

Image segmentation (step 21) can be accomplished using methods known to those skilled in the art. One known segmentation method is to find two thresholds from the image histogram, then segment the image into foreground, background and anatomy regions. FIG. 3A shows an exemplary radiograph (of a foot) and FIGS. 3B through 3D show its foreground, background and anatomy images obtained from segmentation.

Once the image is segmented, the foreground and background regions are removed from the sub-sampled image (step 22) by setting the pixels in these regions to a pre-defined value, but the pixels in the remaining anatomy region are kept unchanged. As a result of this step, the preprocessed image only contains the diagnostically useful part of image data, therefore the interference from collimation areas can be minimized and the intensity range of anatomy region can be accurately detected.

Figure 3E:

According to the present invention, image intensity normalization is performed over the image (step 23) in order to compensate for difference in exposure densities caused by patient variation and examination condition. One technique to accomplished this step is to detect minimum and maximum brightness values from the image histogram, then apply a linear or log transfer function to adjust the image brightness into a pre-defined range. Histogram equalization could be further performed on the image to spread out those peaks in the image histogram, so that more details in low-contrast regions in the image can be better shown. FIG. 3E shows the resulting image after intensity normalization accomplished using this method. Alternatively, other techniques, such as tone scale method disclosed in U.S. Pat. No. 5,633,511 issued on 1997 by Lee et al. entitled AUTOMATIC TONE SCALE ADJUSTMENT USING IMAGE ACTIVITY MEAURES, incorporated herein by reference, can be used to provide normalization. It is noted that the present invention is not limited to using the above mentioned methods to normalize the image. Other algorithms can be employed which provide a resultant image that demonstrates consistent intensity and contrast.

Dependent on the examination conditions, the size and position, as well as orientation, of the anatomy from the same examination would vary. In addition, the portion of anatomy shown in the radiograph is also varied depending on the patient's situation and the setting of collimation blades. These factors may result in the different looks of radiographs, which can pose challenges to the orientation recognition.

To address these situations, a Region of Interest (ROI) is extracted from radiograph (step 11). The ROI is employed to capture the diagnostically useful part from image data, and minimize the variations introduced by the above factors. With the assistance of this ROI, the orientation recognition now can focus on the contents in the ROI without distraction from the rest of image. To this end, the ROI extraction method (step 11) includes two steps: detecting a medial axis of anatomy in the radiograph and locating the ROI in the radiograph According to the present invention, the medial axis is used to describe the anatomy in radiographs. The medial axis provides a simple description of position and orientation of anatomy in radiographs, and promotes limit search complexity and expedite processing.

Figure 4A:
FIGS. 4A-4C show diagrammatic views illustrating the detection of the medial axis of an anatomy.
Figure 4B:
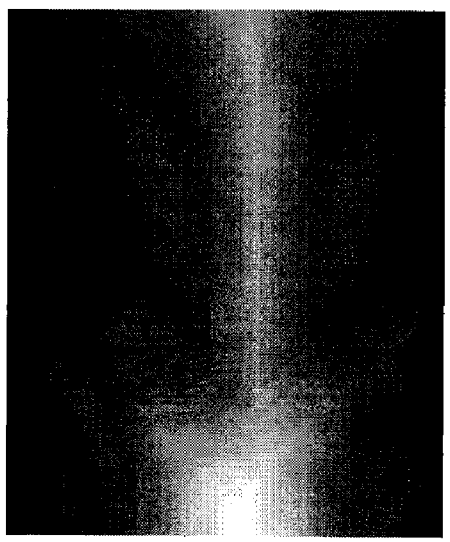
Figure 4C:
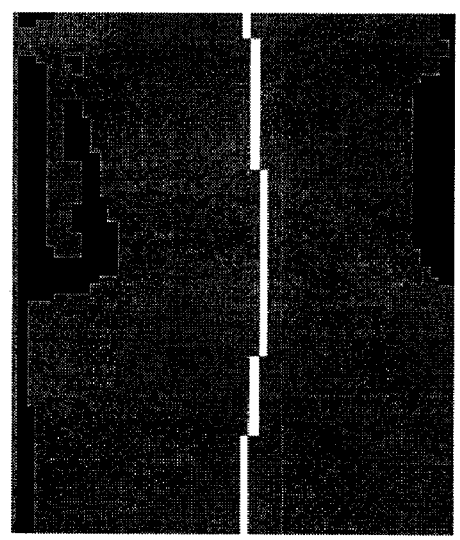

While those skilled in the art may recognize other suitable methods, in a preferred embodiment of the present invention, the medial axis is detected using a Euclidean distance map. More particularly, during the implementation, the contour of the anatomy is detected and used to calculate a Euclidean distance map. FIG. 4A shows an original image, and FIG. 4B shows the Euclidean distance map calculated from the anatomy image of FIG. 4A. Then, the maximum ridge is detected and used as the medial axis. FIG. 4C depicts the resultant medial axis. This method is particularly suitable for the radiographs of extremities, such as elbow, knee, and wrist, and the like, which tend to have simple shapes.

In another embodiment of the present invention, the medial axis can be detected by Multiscale Medial-Analysis (refer to Morse et. al. "Multiscale Medial Analysis of Medical Images", Image and Vision Computing, Vol. 12, No. 6, 1994). A feature of using MMA is that it works directly on image intensities and does not require a prior segmentation of the image or explicit determination of object boundaries.

Locating the ROI starts with searching for the center of ROI, followed by determining the size and shape of the ROI based on the features of the anatomy.

Figure 5A:
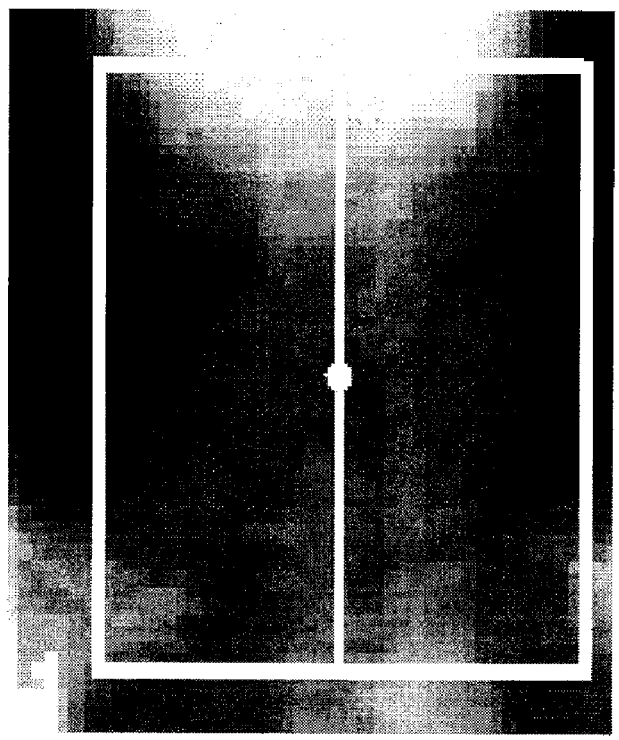
FIGS. 5A and 5B show a diagrammatic view illustrating the shape of region of interest, wherein the (white) dot represents the center of the ROI.
Figure 5B:
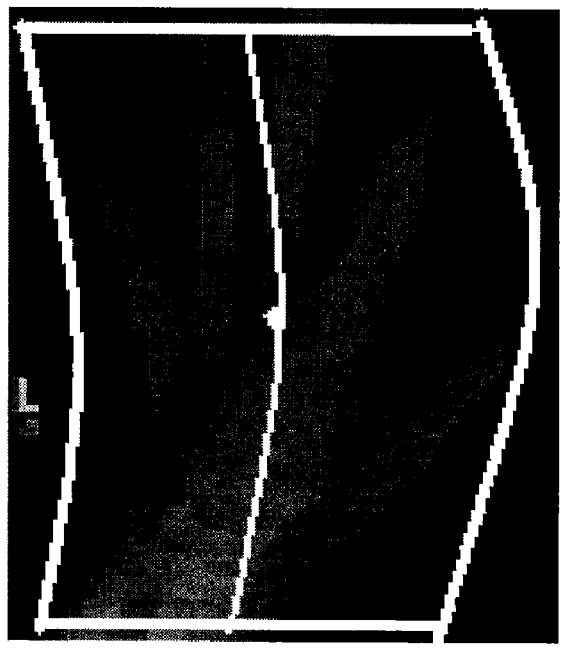

In accordance with the present invention, the center of the ROI is dependent on the characteristics of the anatomy in the examination. For example, in the radiographs of cervical spine examination, the center of ROI is located at the center of neck, as shown in FIG. 5A. For the radiographs of a hand, a center of the palm can be used as the center of ROI, as shown in FIG. 5B.

The size of the ROI is related to the size of the anatomy in the radiograph, which can be derived from the anatomy image with the help of the medial axis. According to the present invention, the size of the ROI is proportional to the minimal distance from the edge of anatomy to the medial axis.

Regarding the shape of the ROI, in the present invention, it is aligned with the medial axis. The medial axis provides the position and orientation information of the anatomy in the radiograph, as such, adapting the shape of the ROI along the medial axis can help reduce effects caused by translation and rotation and ensure that the ROI is translation- and rotation-invariant, which in turn promotes a robust method. FIGS. 5A and 5B demonstrate the different shapes of ROIs extracted from radiographs of different anatomy objects. In FIG. 5A, the medial axis of cervical spine is nearly straight, so the shape of ROI is rectangle. For some anatomies, such as a hand, its medial axis may not always hold straight. As a result, the shape of the ROI may appear as a twisted or slanted strip surrounding the medial axis, such as shown in FIG. 5B.

To compute features for orientation recognition, the ROI is further divided into N*N blocks and a set of low-level visual features are computed from sub-blocks. The number of sub-blocks is determined empirically to balance the trade off between the computation complexity and recognition performance.

While other methods may be employed, according to a preferred embodiment of the present invention, the peripheral sub-blocks within the ROI are used rather than the all sub-blocks over the entire ROI. Such a method is preferred since experimentation has shown that the peripheral of an anatomy already provides sufficient information for orientation detection, and adding the center part of ROI would not improve recognition accuracy and may even degrade the recognition performance in some cases. Moreover, using only the peripheral blocks can-reduce the computation load and speed up the process.

Figure 6:
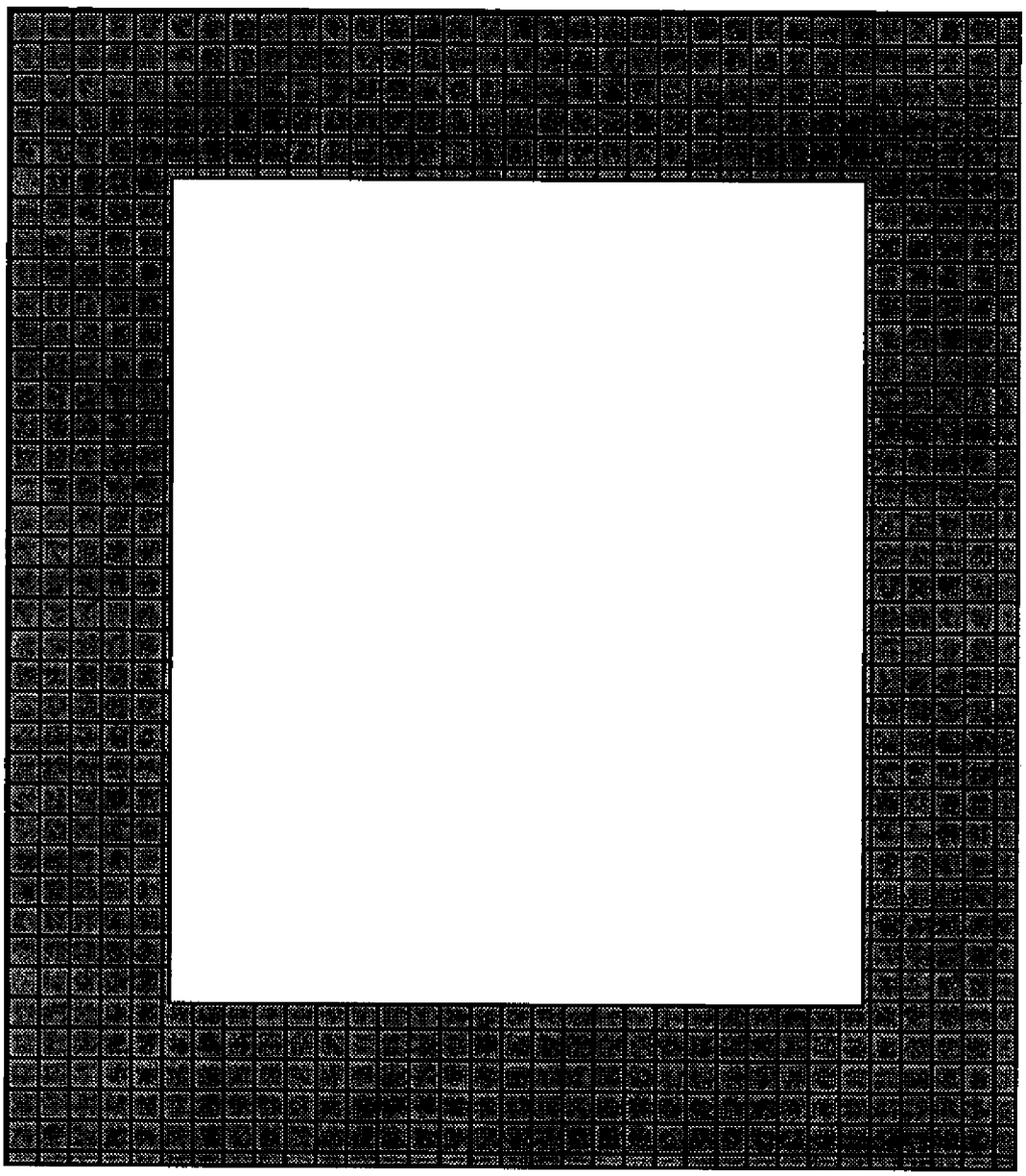
FIG. 6 shows a diagrammatic view showing the selection of peripheral sub blocks of the ROI.

FIG. 6 illustrates the selection of peripheral sub-blocks. In accordance with the present invention, possible low-level features could be the gray level mean, variance, edge information, texture and other image features extracted from sub-blocks. It is noted that, in the preferred embodiment of the present invention, only the peripheral sub-blocks of the ROI are employed. This preferred arrangement differs from Wang et al. ("Detecting image orientation based on low-level visual content", Computer Vision and Image Understanding, Vol. 93, 2004) wherein Wang et al. discloses using the peripheral sub-blocks of the entire original image, which is rectangular by definition. The preferred embodiment of the present invention uses only the peripheral sub-blocks of the ROI. The ROI is not necessarily a rectangular area in the original image, because it adapts to its shape along the medial axis, as was shown and discussed above with regard to FIGS. 5A and 5B.

Having completed the feature extraction, the obtained low-level visual features needs to be normalized over the entire collection of training examples to accommodate the scale difference during the feature extraction. The scaled i th feature component, $x_i$ of a feature vector, x, is calculated as:

$$x_i = x_i - \min_i / \max_i - \min_i$$

where $\min_i$ and $\max_i$ represent the range of the i th feature component $x_i$ of x over the collection of training examples.

At step 12, the image orientation is detected. This step of image orientation is accomplished by a pre-trained classifier. According to an embodiment of the present invention, a method is provided to create such classifier. The method is composed of a training step and a testing step.

During the training step, a collection of training images is first formed with known target orientations. Next, a set of extracted features from individual training images and their associated target outputs, which specify the correct or incorrect orientation, are used to train a classifier. The classifier can use many methods known in the art, such as a neural network and support vector machine. If the original features are not effective for classification, an optional step can be added, which computes a suitable transformation from the original features. The benefit of adding this step is to further study the characteristics of training features and derive the most discriminate features for classification. Examples of transformations include normalization, feature extraction by principle component analysis (PCA) or independent component analysis (ICA), or a non-linear transformation to create secondary features. For more information on classifiers and feature extraction, see Duda, Hart, and Stork, Pattern Classification, John Wiley & Sons, New York, 2001.

Once the classifier is trained, the testing step is performed on novel images to evaluate the performance of classification. If the performance does not or can not satisfy a pre-set requirement, for example, a threshold, the classifier may be biased by, or overfit, the training data. Should this occur, the classifier can be retrained until it performs suitably and/or sufficiently on both training and testing data.

With a pre-trained classifier, the orientation detection (step 12) starts with classifying an input image in its initial orientation. If the orientation is classified with a confidence value, no action needs to be taken further; otherwise, the image is reoriented (step 14).

To accomplish the reorientation (step 14), the image is rotated by 90 degrees and a new ROI is then extracted from image to compute a new set of orientation features. Next, the new features are fed to the classifier to verify whether the rotated image is in its preferred orientation. This operation repeats/continues until the orientation is confirmed with a high confidence value.

According to the present invention, the correct orientation corresponds to the one with the highest confidence level by the classifier. In practice, when the confidence value reaches the maximal or above a pre-determined threshold, its corresponding orientation is assumed to be the preferred orientation of image. The radiograph is subsequently reoriented to that orientation.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 Step—Acquiring a radiographic image
11 Step—Extracting Region of interest from radiograph
12 Step—Detecting the orientation of image
13 Step—Preprocessing the image
14 Step—Reorienting the image
20 Step—Sub-sampling the image
21 Step—Segmenting image into foreground, background and anatomy regions
22 Step—Removing foreground and background regions
23 Step—Normalizing the rest of image

What is claimed is:

1. A method of detecting an orientation of a digital radiograph, comprising the steps of:
   accessing the radiograph;
   locating a region of interest in the radiograph; and
   using the located region of interest and a pre-trained classifier to detect the orientation of the radiograph;
   wherein the method further comprise the step of, prior to locating a region of interest in the radiograph, preprocessing the radiograph;
   wherein the step of preprocessing the radiograph comprises the steps of:
   sub-sampling the radiograph;
   segmenting the radiograph into foreground, background, and anatomy regions;
   removing the foreground region and the background region from the radiograph;
   and normalizing the intensity of the anatomy region of the radiograph.

2. The method of claim 1, wherein the step of locating the region of interest comprises the steps of:
   detecting a medial axis of an anatomy region of the radiograph;
   locating a center of the region of interest;
   determining the size and shape of the region of interest; and
   extracting the region of interest.

3. The method of claim 1, wherein the step of using the located region of interest and a classifier to detect the orientation of the radiograph includes the steps of:
   extracting features of the radiograph; and
   classifying the extracted features.

4. A method of detecting an orientation of a digital radiograph, comprising the steps of:
   accessing the radiograph;
   locating a region of interest in the radiograph; and
   using the located region of interest and a pre-trained classifier to detect the orientation of the radiograph;
   wherein the step of locating the region of interesting comprises the steps of:
   detecting a medial axis of an anatomy region of the radiograph;
   locating a center of the region of interest;
   determining the size and shape of the region of interest; and
   extracting the region of interest;

wherein the step of detecting the medial axis of the anatomy region comprises of the steps of:
detecting a contour of the anatomy region;
computing a distance map of the contour; and
detecting a ridge in the distance map as the medial axis.

5. A method of detecting an orientation of a digital radiograph, comprising the steps of:
accessing the radiograph;
locating a region of interest in the radiograph; and
using the located region of interest and a classifier to detect the orientation of the radiograph;
wherein the step of using the located region of interest and a classifier to detect the orientation of the radiograph comprises the steps of:
extracting a set of orientation related features from the region of interest;
identifying an orientation of the radiograph using the classifier wherein the classifier is a pre-trained classifier;
rotating the radiograph if the orientation is incorrect; and
repeating the step of identifying and rotating until a correct orientation is identified.

6. The method of claim 5, wherein the pre-trained classifier is obtained by the steps of:
collecting a pre-determined number of training radiograph images, each having a known orientation;
locating a region of interest for each training image;
computing a set of features from the region of interest of each training image;
associating a target output specifying the orientation of each training image;
computing a transformation for the feature set; and
training a classifier with the transformed feature set and target output to generate the pre-trained classifier.

7. Method of claim 6, wherein the step of computing a set of features comprises of the steps of:
locating a plurality of peripheral sub-blocks of the region of interest; and
computing a set of features using only the located plurality of peripheral sub-blocks.

8. A method of detecting and orienting a digital radiograph, comprising the steps of;
accessing the radiograph;
preprocessing the radiograph by;
(a) sub-sampling the radiograph;
(b) segmenting the radiograph into foreground, background, and anatomy regions;
(c) removing the foreground region and the background region from the radiograph; and
(d) normalizing the intensity of the anatomy region of the radiograph;
locating a region of interest in the radiograph;
using the located region of interest and a pre-trained classifier to detect the orientation of the radiograph; and
reorienting the radiograph to a preferred orientation for display on a display;
wherein the step normalizing the intensity of the anatomy region of the radiograph comprises the steps of:
detecting a medial axis of the anatomy region;
locating a center of the region of interest;
determining a size and shape of the region of interest; and
extracting the region of interest;
wherein the step of detecting the medial axis of the anatomy region comprises of the steps of:
detecting a contour of the anatomy region;
computing a distance map of the contour; and detecting a ridge in the distance map as the medial axis.

* * * * *